Feb. 14, 1950 R. E. MEEKER ET AL 2,497,464
INCORPORATION OF CLAY FILLER INTO SYNTHETIC RUBBER
Filed April 19, 1947
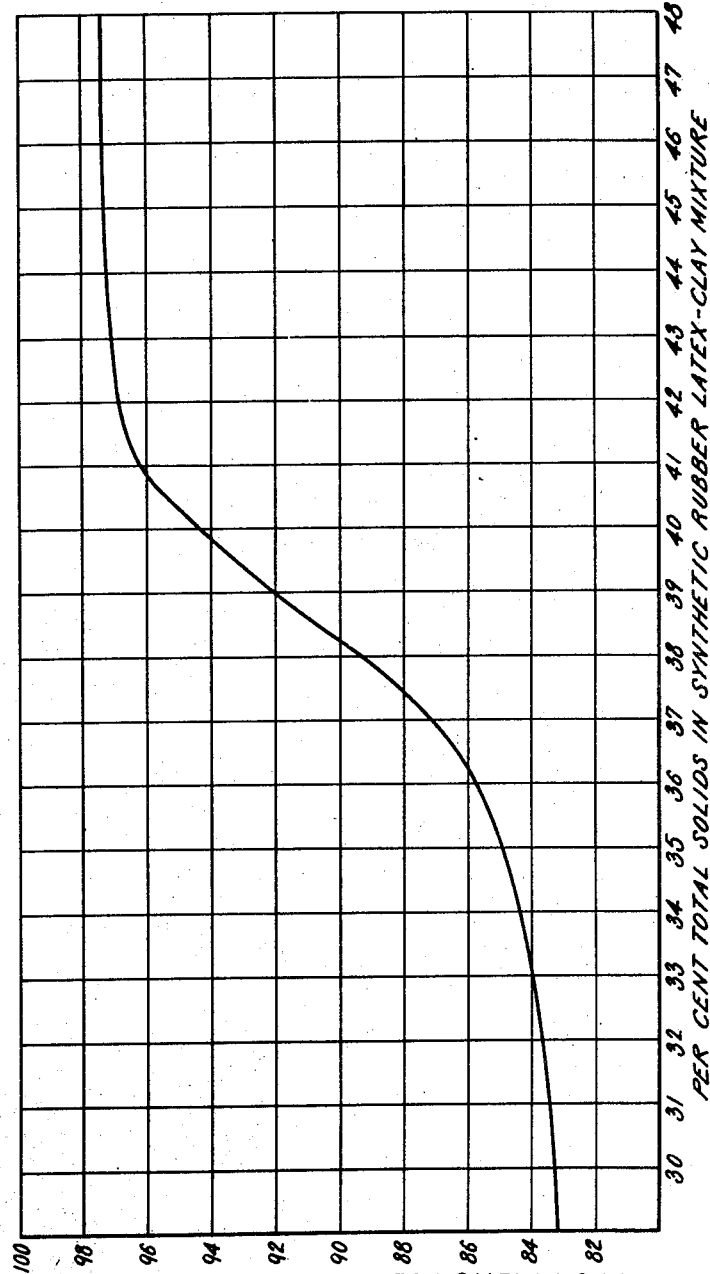
INVENTORS
ROBERT E. MEEKER
HAROLD J. E. SEGRAVE
BY Henry M. Leigh
ATTORNEY Patented Feb. 14, 1950

2,497,464

UNITED STATES PATENT OFFICE 2,497,464

INCORPORATION OF CLAY FILLER INTO SYNTHETIC RUBBER

Robert E. Meeker, South Charleston, W. Va., and Harold J. E. Segrave, Washington, D. C., assignors to United States Rubber Company, New York, N. Y., a corporation of New Jersey Application April 19, 1947, Serial No. 742,498

16 Claims. (Cl. 260—8)

This invention relates to the incorporation of clay filler into synthetic rubber, and more particularly to improvements in the method of making synthetic rubber-clay master batches.

It has been suggested to incorporate clay fillers into synthetic rubber by incorporating the clay in the synthetic rubber latex and coagulating the mixture to give directly a so-called synthetic rubber-clay master batch. In prior practice, the clay has been added to a synthetic rubber latex such as a commercial GR-S synthetic rubber latex (aqueous emulsion polymerizate of a mixture of butadiene-1,3 and styrene) of 25-30% solids content in the form of an aqueous clay slurry of 15% maximum solids concentration, the mixture coagulated to large filterable flocs by conventional coagulation procedures, the flocs filtered, and the synthetic rubber-clay master batch dried. Large amounts of clay are lost in such prior processes by failure to be coagulated with the rubber flocs, such clay particles remaining suspended in an unfilterable condition in the mother liquor of the latex-coagulant mix. When amounts of clay were equal in weight to the synthetic rubber latex in such prior processes, losses of as high as 40 to 50% of the clay occurred. By the present invention, the clay retention is increased so that only small amounts of clay are lost, even at high ratios of clay to synthetic rubber.

We have found that if the synthetic rubber latex and clay mixture has a solids content of at least 40%, and this latex-clay mixture is introduced into an aqueous coagulant solution of polyvalent metal salt and/or strong acid, the coagulant content of which is maintained at a sufficiently high concentration so that the coagulation of the latex-clay mix is almost instantaneous (to avoid dilution of the latex clay mix before coagulation), only very small amounts of clay will be lost, by failure to be retained in the coagulum.

Commercial synthetic rubber latices as prepared for normal GR-S production have a solids content of about 25 to 35%. All percentages and parts referred to herein are by weight. With such latices, aqueous clay slurries of high clay content are necessary when added to such latices to give the 40% minimum solids content of the latex-clay mixture. Aqueous clay slurries become very viscous at around 15% solids concentration. Small amounts of sodium hydroxide, or mixtures of sodium hydroxide with sodium silicate or sodium phosphates, will readily give a low viscosity high solids suspension of clay in water which will readily mix with synthetic rubber latex of 30-35% solids content to give a latex-clay mixture of the 40% minimum solids content. As little as 0.1% sodium hydroxide based on the clay will give a fluid aqueous clay slurry of 65-70% solids. Clay slurries of 50-60% solids are generally sufficient to give the minimum latex-clay mixture solids concentration with conventional synthetic rubber latices. The clay, if desired, may be added directly to the latex in dry form, where a small amount of caustic soda is present in the latex.

The coagulant for the latex-clay mixture may be an aqueous solution of polyvalent metal salt, for example, aluminum sulfate, zinc sulfate, zinc chloride, magnesium sulfate, magnesium chloride, calcium chloride, or mixtures thereof, or an aqueous solution of strong acid, for example, sulfuric acid or hydrochloric acid, or a mixture of such acids, or a mixture of at least one such salt and at least one such strong acid. In such coagulant solutions, the amount of coagulant should be maintained at certain minimum concentrations of such polyvalent metal salt and/or strong acid coagulant. The minimum concentration of polyvalent metal salt or salts is 1% based on the aqueous phase or mother liquor of the latex-coagulant mixture. The minimum concentration of sulfuric acid (free $H_2SO_4$) is 0.5% based on the aqueous phase or mother liquor of the latex-coagulant mixture. In the case of hydrochloric acid in the coagulant, it is more convenient in practice to maintain a pH below 3 for the latex-coagulant mixture. We may, however, take the minimum concentration of hydrochloric acid (free HCl) as 0.1% based on the aqueous phase or mother liquor of the latex-coagulant mixture. As the salts are not appreciably used up in the coagulation of the latex-clay mixture, the amount of salt necessary to give the minimum concentration in the final mother liquor after coagulation may readily be calculated from the water contents of the coagulating bath and latex to be added thereto. When sulfuric or hydrochloric acids are present in the coagulant solution, varying amounts of these may be used up depending on the alkalinity of the latex and the amount of alkali hydroxide, if any, used to disperse the clay, and provision therefor can be made in order to maintain the required minimum acid concentrations in the latex-coagulant mixture. As removal of large amounts of coagulant from the particles of coagulum is difficult, it is not recommended that the concentration in the coagulant bath of such polyvalent metal salts should be maintained at over 4 percent, or of sulfuric acid over 2 percent, or of hydrochloric acid over 1 percent. Such coagulations may be made to take place at room or slightly elevated temperatures. It is preferred to carry out the acid coagulations at room temperature, e. g. 60°–80° F., whereas it is preferable to warm salt coagulant solutions somewhat, e. g. 120°–160° F. before coagulating the latex-clay mixture. We have found that the inclusion in the coagulant solution of a small amount of glue, .02% or more percent based on the weight of the coagulant solution will increase the clay retention. Higher amounts of glue are satisfactory but amounts over 0.1% based on the coagulant solution would not generally be used. This increase in clay retention by virtue of the glue addition has been found to amount to as much as 2 to 5% in the higher ratios of clay to synthetic rubber mixtures, e. g. 90 to 110 parts of clay to 100 parts of synthetic rubber.

In the preparation of synthetic rubber latices, as is known, polymerizable monomeric compounds are emulsified in an aqueous medium by means of an emulsifying agent, such as a water-soluble soap, and the polymerization is made to take place generally at elevated temperatures in the presence of a catalyst and other regulating materials. The monomeric compounds do not completely polymerize and after the desired amount of polymerization has taken place, the unreacted monomers are removed from the synthetic rubber latex, as by venting off gaseous monomers and steam distilling liquid monomers. Examples of water-soluble soaps are the alkali-metal and ammonium salts of the soap-forming monocarboxylic acids, such as the alkali soaps of abietic acid and of aliphatic acids having chains of 8 to 24 carbon atoms in the molecule, for example, alkali soaps of caprylic, pelargonic, capric, lauric, palmitic, stearic, oleic, linoleic acids, and the like. The term "alkali soaps" is conventionally used herein as the generic term which includes alkali-metal and ammonium soaps, and is further used in its commonly accepted sense as exclusive of the alkali-earth and other polyvalent-metal water-insoluble soaps. Examples of polymerizable materials in the preparation of synthetic rubber latices are the various butadienes-1,3, for example, butadiene-1,3, methyl-2-butadiene-1,3 (isoprene), chloro-2-butadiene-1,3 (chloroprene), piperylene, 2,3-dimethyl-butadiene-1,3 and mixtures thereof. The polymerizable material as known may be a mixture of one or more of such butadienes-1,3 with one or more other polymerizable compounds which are capable of forming rubbery copolymers with butadienes-1,3, for example, up to 70% of such mixture of compounds which contains a $CH_2=C<$ group where at least one of the disconnected valences is attached to an electroactive group, that is, a group which substantially increases the electrical dissymmetry or polar character of the molecule. Examples of compounds which contain a $CH_2=C<$ group and are copolymerizable with butadienes-1,3 are aryl olefins, such as styrene, and vinyl naphthalene, the alpha methylene carboxylic acids, and their esters, nitriles and amides, such as acrylic acid, methyl acrylate, methyl methacrylate, acrylonitrile, methacrylonitrile, methacrylamide; isobutylene; methyl vinyl ether; methyl vinyl ketone; vinylidene chloride. Present day commercial synthetic rubbers of the above types are polymerized chloro-2-butadiene-1,3, known as neoprene or GR-M rubber, copolymers of butadiene-1,3 and styrene, known as Buna S or GR-S rubber, and copolymers of butadiene-1,3 and acrylonitrile, known as Buna N or GR-A rubber.

The dispersing agents in the latex-clay mixture from the preparations of the synthetic rubber latex and the aqueous clay slurry should preferably be restricted to alkali-metal and ammonium (generally called "alkali" as in conventional practice) soaps, hydroxides, silicates and phosphates, since the presence of other types of dispersing agents, such as the commercial alkali sulfates and sulfonates of long chain organic compounds, (e. g. alkali alkyl sulfates, alkali alkylated-aryl sulfonates, alkali alkyl sulfosuccinates), tend to increase the loss of clay in the coagulation step when present in the latex-clay mixture.

The concentration of solids in the latex-clay mixture should be at least 40%, since excessive losses of clay are encountered when the solids concentration of the latex-clay mixture is below 40%, particularly where the ratio of clay to synthetic rubber is high, as in the range 90 to 110 parts of clay per 100 parts of synthetic rubber. The ratio of clay to synthetic rubber in the latex-clay mixture is not critical, and may be as low as 50 parts of clay per 100 parts of synthetic rubber and as high as 110 to 150 parts of clay per 100 parts of synthetic rubber. Higher concentrations of solids in the latex-clay mixture than 40% may be used, such higher concentrations being dependent on the desired ratio of clay to latex solids and the concentration of the original synthetic rubber latex, since the clay may be added to the latex dry or as an aqueous slurry of any desired concentration. We have found that a solids concentration of the latex-clay mixture of 43% gives approximately maximum retention of clay in high ratios of clay to synthetic rubber, and it is thus unnecessary to go over 43% solids concentration of the latex-clay mixture, although higher concentrations may be used up to 50% solids and higher without detrimental effect. This is illustrated in the accompanying drawing which is a graph showing the percent retention of clay in coagulated latex-clay mixtures of equal parts of synthetic rubber and clay at various solids concentration of the latex-clay mixture from 29 to 47%. In the graph, the percent of charged clay retained on coagulation in an experimental series of runs is plotted against the total solids of the latex-clay mixture. The synthetic rubber latex was prepared by the conventional aqueous emulsion polymerization of butadiene-1,3 and styrene in a 3:1 ratio emulsified with a sodium soap of a mixture of oleic, palmitic and stearic acids. The latex had a solids content of 30.8%. Dry clay was added to the latex, to which a small amount of sodium hydroxide had been added, until the added clay weight was equal to the weight of the original latex solids. The latex-clay mixture was diluted in steps to about 29% solids. Samples of each concentration of the latex-clay mixture were coagulated by pouring into 1% aqueous $H_2SO_4$ (containing no glue) under constant slow agitation. All samples were coagulated with the same volume of coagulant and all were filtered and washed in the same manner so as to make the results comparable. Retentions were determined by recovering the clay not incorporated into the masterbatch. The percent clay retention in the various coagulations of the latex-clay mixtures of solids content from about 29% to 47% was determined. The graph is a typical curve, and shows that a minimum concentration of solids in the latex-clay mixture of 40% is necessary to provide a reasonably high clay retention. The graph shows that it is not necessary that the concentration of the latex-clay mixture be greater than 43%, since at 42–43% solids, the clay retention approaches the maximum, which is maintained with higher solids concentrations of the latex-clay mixture than 43%. The graph is intended to show the type of curve and the range of solid content of the latex-clay mixture for maximum clay retention, but the graph is not intended to show the absolute percent clay retention since the amount of clay retained in the maximum clay retention will vary with different runs.

The following examples are illustrative of our invention:

Example I

An aqueous emulsion of 5892 pounds of butadiene-1,3 and 2348 pounds of styrene in 13,800 pounds of water containing 375 pounds of sodium soap of a mixture of oleic, stearic and palmitic acids, 20 pounds of potassium persulfate (catalyst) and 44 pounds of dodecyl mercaptan (regulator) was heated at about 122° F. for about 15 hours. The unreacted butadiene was vented off and the unreacted styrene was removed by steam distillation at reduced pressure. The conversion of monomers to synthetic rubber copolymer was about 79%. The solids content of the latex was about 32%.

A clay slurry was prepared by adding .1 part of sodium hydroxide to 40 parts of water and vigorously agitating while adding clay (at such a rate that it readily dispersed) to a total of 60 parts of the clay. The clay slurry and latex were mixed in the proportion necessary to give a ratio of clay to latex solids of 105:100. The solids concentration of the latex-clay mixture was 42.1%. The mixture may be stored under a condition of mild agitation.

The latex-clay mixture was coagulated by directing a stream of the same into a vessel containing aqueous hydrochloric acid in which the pH was maintained below 3 by the addition of small amounts of 0.35% aqueous hydrochloric acid as needed. The coagulant and aqueous hydrochloric acid additions contained about 0.02% glue based on the water phase thereof. The glue increases the clay retention 2 to 5%. Gentle but powerful agitation was maintained in the coagulating vessel. The temperature was maintained at about 80° F. The coagulum product formed as ragged particles of suitable size for conventional GR–S finishing equipment. The coagulum particles were washed free of excess acid and uncombined clay, and dried, baled, and packaged similarly to GR–S synthetic rubber. The clay retention in the synthetic-rubber masterbatch was 95%, about 5% of the clay not being retained in the synthetic rubber-clay master batch.

Example II

A clay slurry synthetic rubber latex mixture was made as described in Example I, except that the dry clay latex solids ratio was made 101:100. The solids concentration of the latex-clay mixture was 42%.

The mixture was coagulated by directing a stream of it into a vessel containing an aqueous solution of technical grade calcium chloride maintained at about one percent concentration. Sufficient glue was added to the calcium chloride solution so that the glue concentration was about 0.02 percent based on the solution. Gentle, but powerful agitation was maintained in the coagulating vessel. The temperature was maintained at about 140° F. The resulting product was of smaller size than that of Example I. Only about 1 percent of the clay was lost to the mother liquor, giving a 99% clay recovery. The product was washed free of excess calcium chloride and uncombined clay, dewatered and dried, baled, and packaged similar to GR–S.

Example III

It was desired to make a product containing 100 parts of clay and 100 parts of GR–S synthetic rubber by the latex masterbatch process. The GR–S latex was made similarly to that in Examples I and II, and had a 32% solids content. A clay slurry was made conveniently in a vessel with vigorous agitation according to the following formula: clay (dry basis) 55 parts, sodium hydroxide 0.05 part, sodium silicate 0.6 part, water 45 parts. The sodium hydroxide, and sodium silicate were added to the water, followed by the clay at such a rate that it is readily dispersed.

The latex and clay slurry were mixed by suitable equipment in the ratio of 110 parts of dry clay per 100 parts of GR–S solids. The mixture could be stored under a condition of mild agitation. The solids concentration of the latex-clay mixture was 41%.

The mixture was coagulated by admitting a stream of it into a vessel in which the concentration of sulfuric acid was maintained at about 0.5 percent concentration. Sufficient glue was added to the acid solution so that the glue concentration was about 0.02 percent that of the dilute acid used. Gentle, but powerful agitation was maintained in the coagulating vessel. The temperature was maintained at about 80° F. The product was lumpy; but of suitable size for conventional GR–S finishing equipment. About 10 percent of the clay remained and was lost in the mother liquor. The product was washed free of excess acid and uncombined clay, and was dried, baled and packaged similarly to GR–S.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The improvement in the method of making a synthetic rubber-clay master batch which comprises directing a mixture of synthetic rubber latex and clay having a solids content of 40% to 43%, and having a dry clay to latex solids ratio from 50:100 to 110:100, into a coagulant bath comprising an aqueous solution of sulfuric acid, the $H_2SO_4$ concentration of coagulant in the resulting mother liquor after the coagulation of the synthetic rubber-clay mix being 0.5% to 2%.

2. The improvement in the method of making a synthetic rubber-clay master batch which comprises directing a mixture of synthetic rubber latex and clay having a solids content of 40% to 43%, and having a dry clay to latex solids ratio from 50:100 to 110:100, into a coagulant bath comprising an aqueous solution of sulfuric acid, the $H_2SO_4$ concentration of coagulant in the resulting mother liquor after the coagulation of the synthetic rubber-clay mix being 0.5% to 2%, said coagulant bath containing glue in amount from 0.02% to 0.1% of the aqueous coagulant solution used.

3. The improvement in the method of making a synthetic rubber-clay master batch which comprises directing a mixture of synthetic rubber latex and clay having a solids content of 40% to 43%, and having a dry clay to latex solids ratio from 50:100 to 110:100, into a coagulant bath comprising an aqueous solution of hydrochloric acid, the HCl concentration of coagulant in the resulting mother liquor after the coagulation of the synthetic rubber-clay mix being 0.1% to 1%.

4. The improvement in the method of making a synthetic rubber-clay master batch which comprises directing a mixture of synthetic rubber latex and clay having a solids content of 40% to 43%, and having a dry clay to latex solids ratio from 50:100 to 110:100, into a coagulant bath comprising an aqueous solution of hydrochloric acid, the HCl concentration of coagulant in the resulting mother liquor after the coagulation of the synthetic rubber-clay mix being 0.1% to 1%, said coagulant bath containing glue in amount from 0.02 to 0.1% of the aqueous coagulant solution used.

5. The improvement in the method of making a synthetic rubber-clay master batch which comprises directing a mixture of synthetic rubber latex and clay having a solids content of 40 to 43%, and having a dry clay to latex solids ratio from 50:100 to 110:100, into an aqueous solution of a coagulant selected from the group consisting of aluminum sulfate, zinc sulfate, zinc chloride, magnesium sulfate, magnesium chloride, calcium chloride, sulfuric acid, and hydrochloric acid, the coagulant content of the solution being maintained at a sufficiently high concentration so that the coagulation of the latex-clay mix is almost instantaneous.

6. The improvement in the method of making a synthetic rubber-clay master batch which comprises directing a mixture of synthetic rubber latex and clay having a solids content of 40 to 43%, and having a dry clay to latex solids ratio from 50:100 to 110:100, into an aqueous solution of a coagulant selected from the group consisting of aluminum sulfate, zinc sulfate, zinc chloride, magnesium sulfate, magnesium chloride, calcium chloride, sulfuric acid, and hydrochloric acid, the coagulant content of the solution being maintained at a sufficiently high concentration so that the coagulation of the latex-clay mix is almost instantaneous, said coagulant solution containing glue in amount from 0.02 to 0.1% of the aqueous coagulant solution used.

7. The improvement in the method of making a synthetic rubber-clay master batch which comprises directing a mixture of synthetic rubber latex, comprising an aqueous emulsion polymerizate of a mixture of butadiene-1,3 with up to 70% of said mixture with butadiene-1,3 of styrene, and clay having a solids content of 40 to 43%, and having a dry clay to latex solids ratio from 50:100 to 110:100, into an aqueous solution of a coagulant selected from the group consisting of aluminum sulfate, zinc sulfate, zinc chloride, magnesium sulfate, magnesium chloride, calcium chloride, sulfuric acid, and hydrochloric acid, the coagulant content of the solution being maintained at a sufficiently high concentration so that the coagulation of the latex-clay mix is almost instantaneous.

8. The improvement in the method of making a synthetic rubber-clay master batch which comprises directing a mixture of synthetic rubber latex, comprising an aqueous emulsion polymerizate of a mixture of butadiene-1,3 with up to 70% of said mixture with butadiene-1,3 of styrene, and clay having a solids content of 40 to 43%, and having a dry clay to latex solids ratio from 50:100 to 110:100, into an aqueous solution of a coagulant selected from the group consisting of aluminum sulfate, zinc sulfate, zinc chloride, magnesium sulfate, magnesium chloride, calcium chloride, sulfuric acid, and hydrochloric acid, the coagulant content of the solution being maintained at a sufficiently high concentration so that the coagulation of the latex-clay mix is almost instantaneous, said coagulant solution containing glue in amount from 0.02 to 0.1% of the aqueous coagulant solution used.

9. The improvement in the method of making a synthetic rubber-clay master batch which comprises directing a mixture of synthetic rubber latex, comprising an aqueous emulsion polymerizate of a mixture of butadiene-1,3 with up to 70% of said mixture with butadiene-1,3 of a compound which contains a $CH_2=C<$ group and is copolymerizable with butadiene-1,3, and clay having a solids content of 40 to 50%, and having a dry clay to latex solids ratio from 50:100 to 110:100, into a coagulant bath comprising an aqueous solution of calcium chloride, the amount of calcium chloride in said coagulant bath being equal to 1% to 4% of the mother liquor after the coagulation of the synthetic rubber-clay mix.

10. The improvement in the method of making a synthetic rubber-clay master batch which comprises directing a mixture of synthetic rubber latex, comprising an aqueous emulsion polymerizate of a mixture of butadiene-1,3 with up to 70% of said mixture with butadiene-1,3 of a compound which contains a $CH_2=C<$ group and is copolymerizable with butadiene-1,3, and clay having a solids content of 40 to 50%, and having a dry clay to latex solids ratio from 50:100 to 110:100, into a coagulant bath comprising an aqueous solution of glue and calcium chloride, the amount of glue being from 0.02 to 0.1% of said coagulant solution, and the amount of calcium chloride in said coagulant bath being equal to 1% to 4% of the mother liquor after the coagulation of the synthetic rubber-clay mix.

11. The improvement in the method of making a synthetic rubber-clay master batch which comprises directing a mixture of synthetic rubber latex, comprising an aqueous emulsion polymerizate of a mixture of butadiene-1,3 with up to 70% of said mixture with butadiene-1,3 of a compound which contains a $CH_2=C<$ group and is copolymerizable with butadiene-1,3, and clay having a solids content of 40 to 50%, and having a dry clay to latex solids ratio from 50:100 to 110:100, into a coagulant bath comprising an aqueous solution of sulfuric acid, the $H_2SO_4$ concentration of which is maintained at from 0.5 to 2% during the coagulation operation.

12. The improvement in the method of making a synthetic rubber-clay master batch which comprises directing a mixture of synthetic rubber latex, comprising an aqueous emulsion polymerizate of a mixture of butadiene-1,3 with up to 70% of said mixture with butadiene-1,3 of a compound which contains a $CH_2=C<$ group and is copolymerizable with butadiene-1,3, and clay having a solids content of 40 to 50%, and having a dry clay to latex solids ratio from 50:100 to 110:100, into a coagulant bath comprising an aqueous solution containing glue and sulfuric acid, the glue concentration of which is 0.02 to 0.1%, and the H₂SO₄ concentration of which is maintained at from 0.5 to 2% during the coagulation operation.

13. The improvement in the method of making a synthetic rubber-clay master batch which comprises directing a mixture of synthetic rubber latex, comprising an aqueous emulsion polymerizate of a mixture of butadiene-1,3 with up to 70% of said mixture with butadiene-1,3 of a compound which contains a CH₂=C< group and is copolymerizable with butadiene-1,3, and clay having a solids content of 40 to 50%, and having a dry clay to latex solids ratio from 50:100 to 110:100, into a coagulant bath comprising an aqueous solution of hydrochloric acid, the pH of which is maintained below 3 during the coagulation operation.

14. The improvement in the method of making a synthetic rubber-clay master batch which comprises directing a mixture of synthetic rubber latex, comprising an aqueous emulsion polymerizate of a mixture of butadiene-1,3 with up to 70% of said mixture with butadiene-1,3 of a compound which contains a CH₂=C< group and is copolymerizable with butadiene-1,3, and clay having a solids content of 40 to 50%, and having a dry clay to latex solids ratio from 50:100 to 110:100, into a coagulant bath comprising an aqueous solution of hydrochloric acid, the HCl concentration of which is maintained at from 0.1 to 1% during the coagulation operation.

15. The improvement in the method of making a synthetic rubber-clay master batch which comprises directing a mixture of synthetic rubber latex, comprising an aqueous emulsion polymerizate of a mixture of butadiene-1,3 with up to 70% of said mixture with butadiene-1,3 of a compound which contains a CH₂=C< group and is copolymerizable with butadiene-1,3, and clay having a solids content of 40 to 50%, and having a dry clay to latex solids ratio from 50:100 to 110:100, into a coagulant bath comprising an aqueous solution of glue and hydrochloric acid, the glue concentration of which is 0.02 to 0.1%, and the HCl concentration of which is maintained at from 0.1 to 1% during the coagulation operation.

16. The improvement in the method of making a synthetic rubber-clay master batch which comprises directing a mixture of synthetic rubber latex, comprising an aqueous emulsion polymerizate of a mixture of butadiene-1,3 with up to 70% of said mixture with butadiene-1,3 of a compound which contains a CH₂=C< group and is copolymerizable with butadiene-1,3, and clay having a solids content of 40 to 50%, and having a dry clay to latex solids ratio from 50:100 to 110:100, into a coagulant bath comprising an aqueous solution of glue and hydrochloric acid, the glue concentration of which is 0.02 to 0.1%, and the HCl concentration of which is maintained below a pH of 3 during the coagulation operation.

ROBERT E. MEEKER.
HAROLD J. E. SEGRAVE.

REFERENCES CITED

The following references are of record in the file of this patent:

UNITED STATES PATENTS

| Number | Name | Date |
| --- | --- | --- |
| 2,295,030 | Dales | Sept. 8, 1942 |
| 2,340,358 | Young | Feb. 1, 1944 |
| 2,424,648 | Bixby | July 29, 1947 |

OTHER REFERENCES

Article by Borg et al., Ind. and Eng. Chem., Oct. 1946, vol. 38, No. 10 (pages 1013–1015).